(12) United States Patent
Miller et al.

(10) Patent No.: US 7,413,793 B2
(45) Date of Patent: *Aug. 19, 2008

(54) INDUCTION FURNACE WITH UNIQUE CARBON FOAM INSULATION

(75) Inventors: Douglas J. Miller, North Olmsted, OH (US); Irwin C. Lewis, Strongsville, OH (US)

(73) Assignee: GrafTech International Holdings Inc., Parma, OH (US)

( * ) Notice: Subject to any disclaimer, the term of this patent is extended or adjusted under 35 U.S.C. 154(b) by 157 days.

This patent is subject to a terminal disclaimer.

(21) Appl. No.: 11/351,326

(22) Filed: Feb. 9, 2006

(65) Prior Publication Data

US 2007/0110985 A1    May 17, 2007

Related U.S. Application Data

(63) Continuation-in-part of application No. 10/970,352, filed on Oct. 21, 2004.

(51) Int. Cl.
  *B32B 23/04* (2006.01)
  *B32B 3/26* (2006.01)

(52) U.S. Cl. ............... 428/192; 428/314.2; 428/315.5; 428/315.7

(58) Field of Classification Search ............... 428/314.2, 428/315.5, 315.7, 192
See application file for complete search history.

(56) References Cited

U.S. PATENT DOCUMENTS

| | | | |
|---|---|---|---|
| 3,302,399 A | 2/1967 | Tini et al. ................... 60/39.7 |
| 3,302,909 A | 2/1967 | Glassman ................... 248/44 |
| 3,309,437 A | 3/1967 | Harnett ........................ 264/29 |
| 3,387,940 A | 6/1968 | McHenry et al. ........... 23/209.2 |
| 3,632,385 A | 1/1972 | Schmitt et al. ................ 117/46 |
| RE28,574 E | 10/1975 | Ruoff ............................ 425/78 |
| 3,960,761 A | 6/1976 | Burger et al. ................ 252/421 |
| 4,190,637 A | 2/1980 | Kennedy .................... 423/448 |
| 4,205,055 A * | 5/1980 | Maire et al. ............. 423/445 R |
| 4,619,796 A | 10/1986 | Awata et al. ............... 264/29.4 |
| 4,681,718 A | 7/1987 | Oldham ....................... 264/102 |
| 4,851,280 A | 7/1989 | Gupta ......................... 428/246 |
| 4,879,182 A | 11/1989 | Presswood et al. .......... 428/408 |
| 4,966,919 A * | 10/1990 | Williams et al. ............. 521/54 |
| 4,992,254 A | 2/1991 | Kong ......................... 423/449 |
| 5,047,225 A | 9/1991 | Kong ......................... 423/447 |
| 5,211,786 A | 5/1993 | Enloe et al. ................... 156/89 |
| 5,282,734 A | 2/1994 | Pastureau et al. .......... 425/393 |
| 5,648,027 A | 7/1997 | Tajiri et al. ................... 264/43 |

(Continued)

OTHER PUBLICATIONS

Modifications of Phenolic Precursor Carbon Foam, R.A. Mercuri and J.M. Criscione, Fuel Division of American Chemical Society, 156th Annual Meeting, Proceedings of 9th Carbon Conference, Jun. 16-20, 1969, p. 206 and 207.

(Continued)

*Primary Examiner*—Hai Vo
(74) *Attorney, Agent, or Firm*—Waddey & Patterson, PC; James R. Cartiglia

(57) ABSTRACT

An insulative cap for an induction furnace comprising a carbon foam having a pore distribution such that at least about 90% of the pore volume of the pores have a diameter of between about 10 and about 150 microns and at least about 1% of the pores have a diameter of between about 0.8 and about 3.5 microns.

9 Claims, 7 Drawing Sheets

U.S. PATENT DOCUMENTS

| | | | |
|---|---|---|---|
| 5,686,038 A | 11/1997 | Christensen et al. | 264/257 |
| 5,709,893 A | 1/1998 | McCarville et al. | 425/389 |
| 5,730,915 A | 3/1998 | Cornie | 264/29.1 |
| 5,868,974 A | 2/1999 | Kearns | 264/29.6 |
| 5,888,469 A | 3/1999 | Stiller et al. | 423/445 |
| 5,888,649 A | 3/1999 | Curatolo et al. | 428/352 |
| 5,937,932 A | 8/1999 | Cornie | 164/526 |
| 5,945,084 A | 8/1999 | Droege | 423/447.4 |
| 5,961,814 A | 10/1999 | Kearns | 208/39 |
| 5,984,256 A | 11/1999 | Endo | 249/114.1 |
| 6,024,555 A | 2/2000 | Goodridge et al. | 425/394 |
| 6,033,506 A | 3/2000 | Klett | 156/78 |
| 6,093,245 A | 7/2000 | Hammond et al. | 117/200 |
| 6,099,792 A | 8/2000 | Ganguli et al. | 264/621 |
| 6,103,149 A | 8/2000 | Stankiewicz | 264/29.1 |
| 6,183,854 B1 | 2/2001 | Stiller et al. | 428/312.2 |
| 6,217,800 B1 | 4/2001 | Hayward | 264/29.1 |
| 6,241,957 B1 | 6/2001 | Stiller et al. | 423/448 |
| 6,344,159 B1 | 2/2002 | Klett | 264/29.7 |
| 6,346,226 B1 | 2/2002 | Stiller et al. | 423/448 |
| 6,387,343 B1 | 5/2002 | Klett | 423/448 |
| 6,399,149 B1 | 6/2002 | Klett et al. | 427/230 |
| 6,506,354 B1 | 1/2003 | Stiller et al. | 423/445 |
| 6,576,168 B2 | 6/2003 | Hardcastle et al. | 264/29.1 |
| 6,656,238 B1 | 12/2003 | Rogers et al. | 44/620 |
| 6,724,803 B2 | 4/2004 | Miller et al. | 373/140 |
| 6,776,936 B2 | 8/2004 | Hardcastle et al. | 264/29.1 |
| 6,849,098 B1 | 2/2005 | Joseph et al. | 44/620 |
| 6,899,970 B1 | 5/2005 | Rogers et al. | 429/27 |
| 6,994,886 B2 | 2/2006 | David et al. | 427/226 |
| 7,232,606 B2 * | 6/2007 | Shao et al. | 428/317.3 |
| 7,264,878 B2 * | 9/2007 | Miller et al. | 428/408 |
| 2002/0190414 A1 | 12/2002 | Hardcastle et al. | |
| 2005/0003195 A1 * | 1/2005 | Joseph et al. | 428/408 |
| 2006/0014908 A1 | 1/2006 | Rotermund et al. | |
| 2006/0086043 A1 * | 4/2006 | Miller et al. | 44/607 |
| 2007/0155847 A1 * | 7/2007 | Miller et al. | 521/180 |

OTHER PUBLICATIONS

Touchstone Research Laboratory, Ltd., Product Data Sheet: CFOAM Carbon Foams, Rev8-0803.
ORNL High Thermal Conductivity Graphite Foams.
Carbon Graphite Foams at MER Corporation.
POCO Graphite Foam, Properties and Characteristics, Jun. 29, 2001.
Article in High-Performance Composites, Sep. 2004, p. 25.
Modifications of Phenolic Precursor Carbon Foam, R.A. Mercuri and J.M. Criscione, Fuel Division of American Chemical Society, 156th Annual Meeting, Proceedings of 9th Carbon Conference, Jun. 16-20, 1969, p. 206.
Preparation and Graphitization of High-Performance Carbon Foams From Coal, Rogers, et al., Touchstone Research Laboratory, Ltd.
Low-Cost Carbon Foams for Thermal Protection and Reinforcement Applications, Rogers, et al., Touchstone Research Laboratory, pp. 293-305.
Coal-Based Carbon Foam for High Temperature Applications, Dwayne R. Morgan, Touchstone Research Laboratory, Inc.
Precursor Effects on Graphite Foams, Cooling Power Electronics Using Graphite Foams, ORNL Carbon and Graphite Foams.
High Thermal Conductivity, Mesophase Pitch-Derived Carbon Foam, 43rd International SAMPE Symposium, May 31-Jun. 4, 1998, pp. 745, 746.
Microcellular Pitch-Based Carbon Foams Blown with Helium Gas, Anderson, et al., 43rd International SAMPE Symposium, May 31-Jun. 4, 1998, pp. 756, 758, and 760.
High Thermal Conductivity Graphite Foam—Progress and Opportunities, Wiechmann, et al., Composite Optics, Inc.
Performance of Alternate Precursors for Graphite Foam, James Klett and Claudia Walls, Oak Ridge National Laboratory.
Japanese article Structural and thermal characteristics of highly graphitizable AR-Foam by Fumitaka Watanabe and Isao Mochida.
GB-263—Advanced Structural Carbons: Fibers, Foams and Composites, pp. 43-51.
Characterization Requirements for Aerospace Thermal Management Applications, Brow, et al.
Aztex X-Cor, High Performance, Damage Tolerant Composite Core Material, Oct. 2002.
GB Patent Specification 1,489,690, Application No. 28255/75, filed Jul. 4, 1975 titled "Briquetting Coal".
"A Novel Carbon Fiber Based Porous Carbon Monolith" by T.D. Burchell, J.W. Klett, and C.E. Weaver, Proceedings of the Ninth Annual Conference on Fossil Energy Materials, Oak Ridge, TN, May 16-18, 1995.
Kirk-Othmer, Encyclopedia of Chemical Technology, 4th ed., vol. 6, John Wiley & Sons, Application of Coal Petrology and Petrography, pp. 429-434 and 454-455, 1993.

* cited by examiner

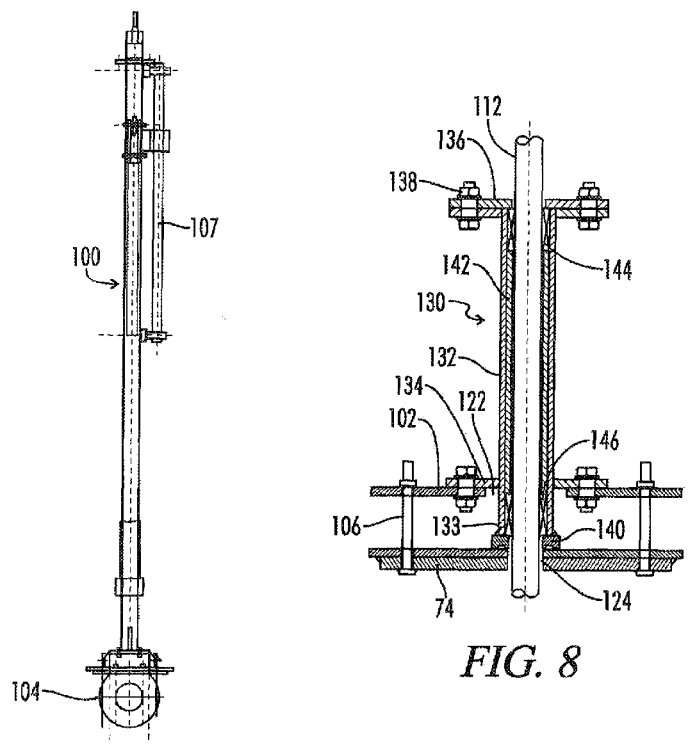
FIG. 7
FIG. 8
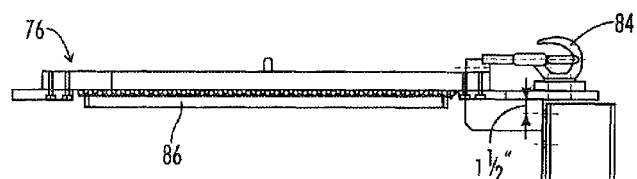
FIG. 11

INDUCTION FURNACE WITH UNIQUE CARBON FOAM INSULATION

RELATED APPLICATIONS

This application is a continuation-in-part of copending and commonly assigned U.S. patent application Ser. No. 10/970,352, filed in the names of Douglas J. Miller, Irwin C. Lewis, and Robert A. Mercuri on Oct. 21, 2004, entitled "High Strength Monolithic Carbon Foam," the disclosures of which are incorporated herein by reference.

BACKGROUND OF THE INVENTION

1. Field of the Invention

The invention relates to an induction furnace suited to operation at temperatures of around 3000° C. and above, and employing a unique carbon foam insulation material. The induction furnace finds particular application in conjunction with the graphitization of pitch fibers and other carbon-containing fibers and will be described with particular reference thereto. It should be appreciated, however, that the furnace is also suited to other high temperature processes, such as halogen purification of graphitic materials to remove metal impurities.

2. Discussion of the Art

Batch induction furnaces have been used for many years for fiber graphitization and other high temperature operations. A typical induction furnace includes an electrically conductive vessel, known as a susceptor. A time-varying electromagnetic field is generated by an alternating current (ac) flowing in an induction heating coil. The magnetic field generated by the coil passes through the susceptor. The magnetic field induces currents in the susceptor, which generate heat. The material to be heated is contained within the susceptor in what is commonly referred to as the "hot zone," or hottest part of the furnace.

For operations which require high temperatures, of up to about 3000° C., graphite is a preferred material for forming the susceptor, since it is both electrically conductive and able to withstand very high temperatures. There is a tendency, however, for the graphite to sublime, turning to vapor. Sublimation increases markedly as the temperature rises above about 3100° C. Because of variations in temperature throughout the susceptor, furnace life, at a nominal operating temperature of about 3100° C. is typically measured in weeks. Life at 3400° C. is often only a matter of hours. Thus, furnaces which are operated at temperatures of over 3000° C. tend to suffer considerable downtime for replacement of components.

Graphitization of carbon-containing fibers, in particular, benefits from treatment temperatures of over 3000° C. For example, in the formation of lithium batteries, uptake of lithium is dependent on the temperature of graphitization, improving as the graphitization temperature increases. Some improvements in the heat distribution throughout the susceptor have been accomplished by measuring the temperature at different points within the furnace during heating using pyrometers. Different densities of induction power are then delivered to multiple sections of the susceptor along its length, according to the measured temperatures. However, pyrometers are prone to failure and need recalibration over time.

To increase the lifetime of the susceptor, it is desirable to cool the furnace rapidly once the high temperature heating operation is complete. Typically, cooling coils carry water around the furnace. However, because the furnace is generally well insulated, it often takes about a week to cool the furnace down from its operating temperature. In some applications, heat exchangers are employed to speed cooling. In such designs, the furnace is cooled to a temperature of about 1500° C. by heat loss through the furnace insulation. Then, valves above and below the hot zone are opened and forced circulation through an external heat exchanger is begun. This system works well for furnaces that are rarely operated above 2800° C. In furnaces that are routinely operated above 3000° C., the frequent replacement of hot zone components renders these designs expensive to operate. In other designs, the loose insulation material above the furnace is knocked off the furnace to speed cooling. As a result, the insulation needs to be replaced after each furnace run.

The present invention provides a new and improved induction furnace and method of use, which overcome the above-referenced problems, and others.

SUMMARY OF THE INVENTION

In accordance with one aspect of the present invention, a furnace is provided. The furnace includes a vessel which defines an interior chamber for receiving items to be treated and a heating means which heats the vessel. A cap selectively closes the vessel interior chamber. The cap includes a lid portion attached to an insulative plug formed of a unique carbon foam insulation material. A cooling assembly includes a dome which defines a chamber and a lifting mechanism which selectively lifts the cap allowing hot gas to flow from the vessel interior chamber to the dome.

In accordance with another aspect of the present invention, a cooling assembly for a furnace is provided. The cooling assembly includes a dome which defines an interior chamber. A cooling means cools the dome. The assembly includes means for selectively providing fluid communication between a hot zone of the induction furnace and the dome and means for controlling the communicating means in accordance with at least one of a temperature of the hot zone and a temperature of the interior chamber.

In accordance with yet another aspect of the present invention, an induction furnace is provided. The furnace includes a susceptor which defines an interior chamber for receiving items to be treated, the susceptor being formed from graphite. An induction coil induces a current in the susceptor to heat the susceptor. A layer of flexible graphite, exterior to the susceptor, inhibits escape of carbon vapor which has sublimed from the susceptor.

In accordance with yet another aspect of the present invention, a method of operating a furnace is provided. The method includes heating items to be treated in a first chamber which contains a gas and actively cooling a second chamber which contains a gas. The second chamber is selectively fluidly connectable with the first chamber. After the step of heating, the first chamber is cooled by selectively fluidly connecting the first chamber with the second chamber, thereby allowing heat to flow from the gas in the first chamber to the gas in the second chamber.

An advantage of at least one embodiment of the present invention is that significant increases in furnace life are obtained.

Another advantage of at least one embodiment of the present invention is that cool down times are reduced.

Another advantage of at least one embodiment of the present invention is that the cooling assembly is readily removable from the furnace, simplifying removal and replacement of the susceptor and other hot zone components.

Other advantages of at least one embodiment of the present invention derive from greater accuracy in monitoring variations in furnace temperature throughout the furnace.

Still further advantages of the present invention will be readily apparent to those skilled in the art, upon a reading of the following disclosure and a review of the accompanying drawings.

BRIEF DESCRIPTION OF THE DRAWINGS

FIG. 7 is an enlarged side sectional view of the actuator of FIG. 5;

FIG. 8 is an enlarged sectional view of the sealing and guiding mechanism of FIG. 5;

FIG. 11 is a side sectional view of the clamping mechanism of FIG. 5.

DETAILED DESCRIPTION OF THE PREFERRED EMBODIMENT

Figure 1:
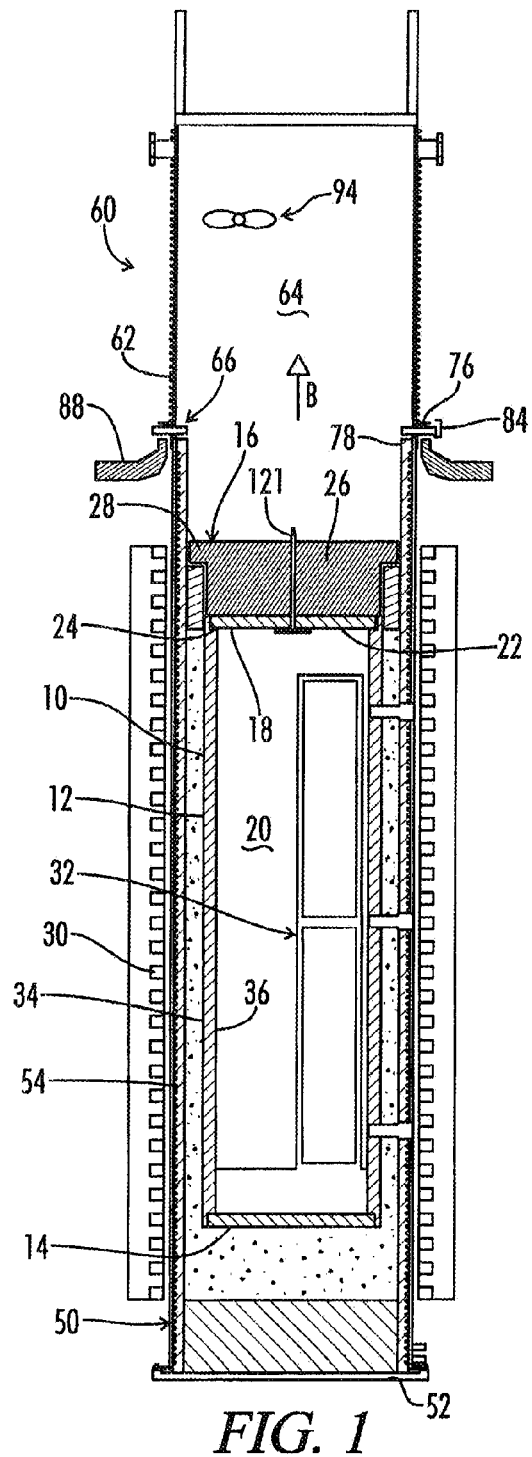
FIG. 1 is a side sectional view of a batch induction furnace according to the present invention, showing a furnace cap in a closed position.
Figure 2:
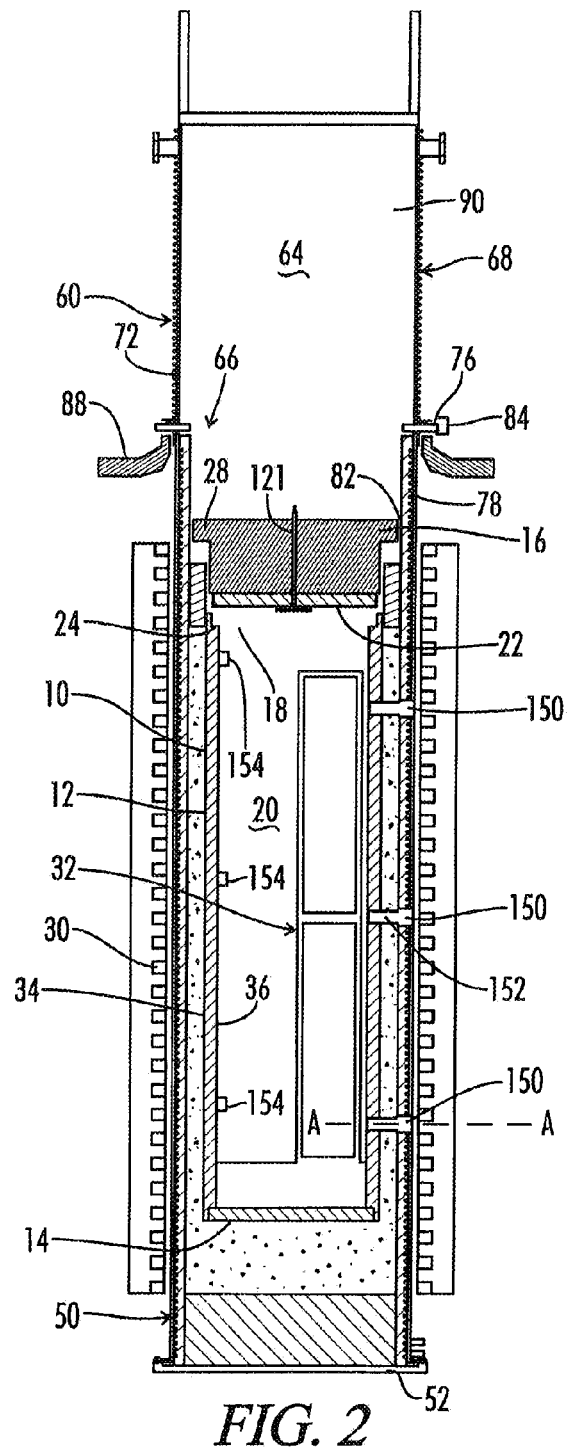
FIG. 2 is a side sectional view of the batch induction furnace of FIG. 1, showing the furnace cap in an open position

With reference to FIGS. 1 and 2, an induction furnace suited to operation at temperatures of over 3000° C. includes a susceptor 10 formed from an electrically conductive material, such as graphite. The susceptor includes a cylindrical side wall 12 closed at a lower end by a base 14. A removable insulative cap 16 closes an upper open end 18 of the susceptor to define an interior chamber 20, which provides a hot zone for receiving items to be treated. The cap 16 includes a lid portion 22, formed from graphite, which seats on a shelf 24 defined by the susceptor adjacent the upper end 18. The lid portion 22 is attached to a lower surface of an enlarged insulative plug 26, preferably formed from a carbon foam insulation material. The suitable carbon foam insulation should exhibit a density, compressive strength and compressive strength to density ratio to provide a combination of strength and relatively light weight characteristics not heretofore seen. In addition, the monolithic nature and bimodal cell structure of the foam, with a combination of larger and smaller pores, which are relatively spherical, provide a carbon foam which can be produced in a desired size and configuration and which can be readily machined. The foam plug 26 has an outwardly extending peripheral flange at its upper end.

Carbon foam insulating materials in accordance with the present invention are prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed of open and closed cells. The resins are generally aqueous resoles catalyzed by sodium hydroxide at a formaldehyde:phenol ratio which can vary, but is preferably about 2:1. Free phenol and formaldehyde content should be low, although urea may be used as a formaldehyde scavenger.

The foam is prepared by adjusting the water content of the resin and adding a surfactant (eg, an ethoxylated nonionic), a blowing agent (eg, pentane, methylene chloride, or chlorofluorocarbon), and a catalyst (eg, toluenesulfonic acid or phenolsulfonic acid). The sulfonic acid catalyzes the reaction, while the exotherm causes the blowing agent, emulsified in the resin, to evaporate and expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p.p'-dihydrexydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the invention are those described in U.S. Pat. Nos. 3,960,761 and 5,047,225, the disclosures of which are incorporated herein by reference.

The polymeric foam used as the starting material in the production of the inventive insulation foam should have an initial density which mirrors the desired final density for the carbon foam which is to be formed. In other words, the polymeric foam should have a density of about 0.1 to about 0.6 g/cc, more preferably about 0.1 to about 0.4 g/cc. The cell structure of the polymeric foam should be closed with a porosity of between about 65% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, but a compressive strength of at least about 2000 psi and, significantly, a ratio of strength to density of at least about 7000 psi/g/cc, more preferably at least about 8000 psi/g/cc. The carbon foam has a relatively uniform distribution of isotropic pores having, on average, an aspect ratio of between about 1.0 and about 1.5.

The resulting carbon foam has a total porosity of about 65% to about 95%, more preferably about 70% to about 95% with a bimodal pore distribution; at least about 90%, more preferably at least about 95%, of the pore volume of the pores are about 10 to about 150 microns in diameter, more preferably about 15 to about 95 microns in diameter, most preferably about 25 to about 95 microns in diameter, while at least about 1%, more preferably about 2% to about 10%, of the pore volume of the pores are about 0.8 to about 3.5 microns, more preferably about 1 to about 2 microns, in diameter. The bimodal nature of the inventive foam provides an intermediate structure between open-celled foams and closed-cell foams, limiting the liquid permeability of the foam while maintaining a foam structure. Permeabilities less than 3.0 darcys, even less than 2.0 darcys, are preferred.

Typically, characteristics such as porosity and individual pore size and shape are measured optically, such as by use of an epoxy microscopy mount using bright field illumination, and are determined using commercially available software, such as Image-Pro Software available from MediaCybernetic of Silver Springs, Md.

The cap 16, which includes lid portion 22 attached to carbon foam insulation plug 26 closes the interior chamber 20 during a heating phase of an induction furnace operating cycle, allowing the furnace to operate under a slight positive pressure of an inert gas, such as argon. The inert gas is one which does not react with the furnace components or product being heat treated over the temperature range to which the components and product are exposed. This prevents oxidation of the carbon and graphite furnace components and product being heat-treated. At operating temperatures below about 1900° C., nitrogen may be used as the inert gas, which is then replaced with argon as the temperature reaches this level. The positive pressure is preferably up to about 20 kg/m$^2$.

The susceptor 10 is inductively heated by an induction coil 30, powered by an AC source (not shown). The coil 30 produces an alternating magnetic field, which passes through the susceptor, inducing an electric current in the susceptor and causing it to heat up. Items to be heat treated, such as pitch fibers for forming graphite, are placed in a canister 32, which is preferably formed from graphite. The canister 32 is loaded into the susceptor chamber 20 prior to a furnace run. Heat is transferred from the susceptor to the fibers by radiation.

The induced current flowing through the susceptor 10 is not uniform throughout its cross section. The current density is greatest at an outer surface 34 and falls off exponentially toward an inner surface 36. The thickness of the susceptor is selected to achieve a relatively uniform current profile through the susceptor and induce some current and heat directly in the graphite canisters 32 inside the furnace. A suitable thickness for the furnace is about 5 cm. The temperature profile through the cross section of the susceptor is one of increasing temperature from the outer surface 34 to a maximum within the susceptor and then decreasing to cooler at the inner surface 36.

Figure 3:
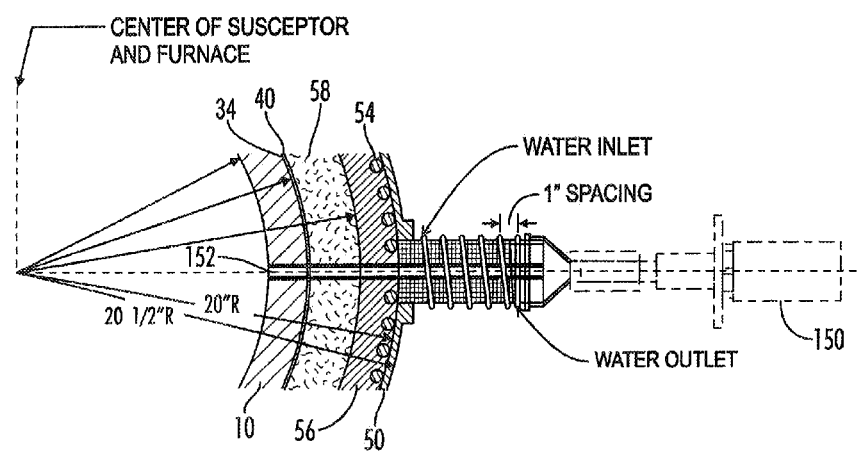
FIG. 3 is an enlarged sectional view through A-A of FIG. 2 of the wall of the furnace showing a pyrometer mounted therein.
Figure 4:
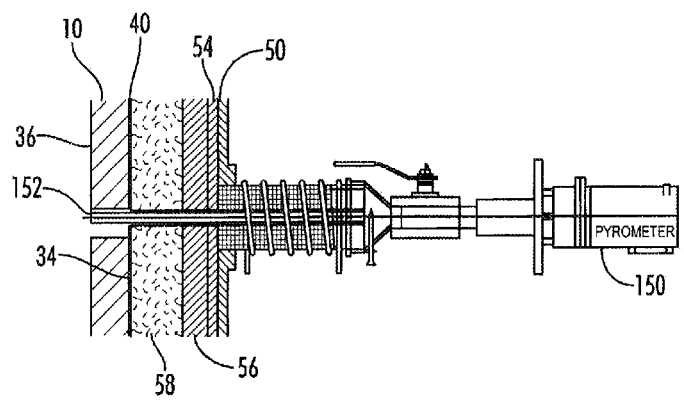
FIG. 4 is an enlarged side sectional view of the furnace wall of FIGS. 1 and 2 showing a pyrometer mounted therein.

As best shown in FIGS. 3 and 4, the outer surface 34 of the susceptor is wrapped with a barrier layer 40 of a flexible graphite sheet material. Suitable graphite sheet is obtainable under the tradename Grafoil® from Advanced Energy Technology Inc., Lakewood, Ohio. The flexible graphite sheet material is preferably formed by intercalating graphite flakes with an intercalation solution comprising acids, such as a combination of sulfuric and nitric acids, and then exfoliating the intercalated particles with heat. Upon exposure to a sufficient temperature, typically about 700° C. or above, the particles expand in accordion-like fashion to produce particles having a vermiform appearance. The "worms" may be compressed together into flexible or integrated sheets of the expanded graphite, typically referred to as "flexible graphite," without the need for a binder.

The density and thickness of the sheet material for the barrier layer 40 can be varied by controlling the degree of compression. The density of the sheet material is generally within the range of from about 0.4 g/cm$^3$ to about 2.0 g/cm$^3$ and the thickness is preferably from about 0.7 to 1.6 mm.

An adhesive (not shown) may be applied between the flexible graphite sheet 40 and the outer surface 34 of the susceptor 10 to hold the sheet in contact with the susceptor during assembly of the furnace. Preferably, the graphite sheet covers the entire outer surface 34 of the susceptor, including the side wall 12 and base 14, although it is also contemplated that the graphite sheet may be employed only adjacent to those areas which are heated to the highest temperatures, commonly termed the "hot zone." The graphite sheet material serves as a vapor barrier around the susceptor, inhibiting escape of carbon vapor which has sublimed from the susceptor surface 34. This causes the partial pressure of carbon vapor to increase in the region adjacent to the susceptor. An equilibrium is soon reached between the rate of vaporization and the rate of redeposition of carbon on the susceptor, which inhibits further vapor loss of graphite from the susceptor.

With continued reference to FIGS. 1 and 3, the susceptor is housed in a pressure vessel 50, formed, for example, from fiberglass with a bottom flange 52 formed from aluminum. The pressure vessel is lined with cooling tubes 54, preferably formed from a non-magnetic material, such as copper. The cooling coils are arranged in vertical, serpentine circuits. The cooling tubes are electrically isolated from each other to prevent current flow in the circumferential direction. A cooling fluid, such as water, is run through the cooling tubes at all times, to prevent overheating of the tubes and other components of the furnace.

The cooling tubes are cast into a thick layer 56 of a refractory material, comprising primarily silicon carbide, which provides good thermal conductivity, strength, and electrical insulation. A layer 58 of an insulation material, which can be formed of the same carbon foam as plug 26, but is more preferably a particulate material such as carbon black, is packed between the refractory material and the susceptor 10 adjacent the sides 12 and base 14. The flexible graphite layer 40 is held in place, during operation of the furnace, by the layer 58 of insulation material. The thickness of the layer 58 of insulation material is kept to a minimum to allow for rapid cool down times. The level of insulation is preferably chosen to prevent excessive heat loss and yet provide for the shortest possible cooling time. The increased power requirements for heating compared with a conventional furnace is offset by the gain in furnace productivity derived from the rapid cool down time.

Figure 5:
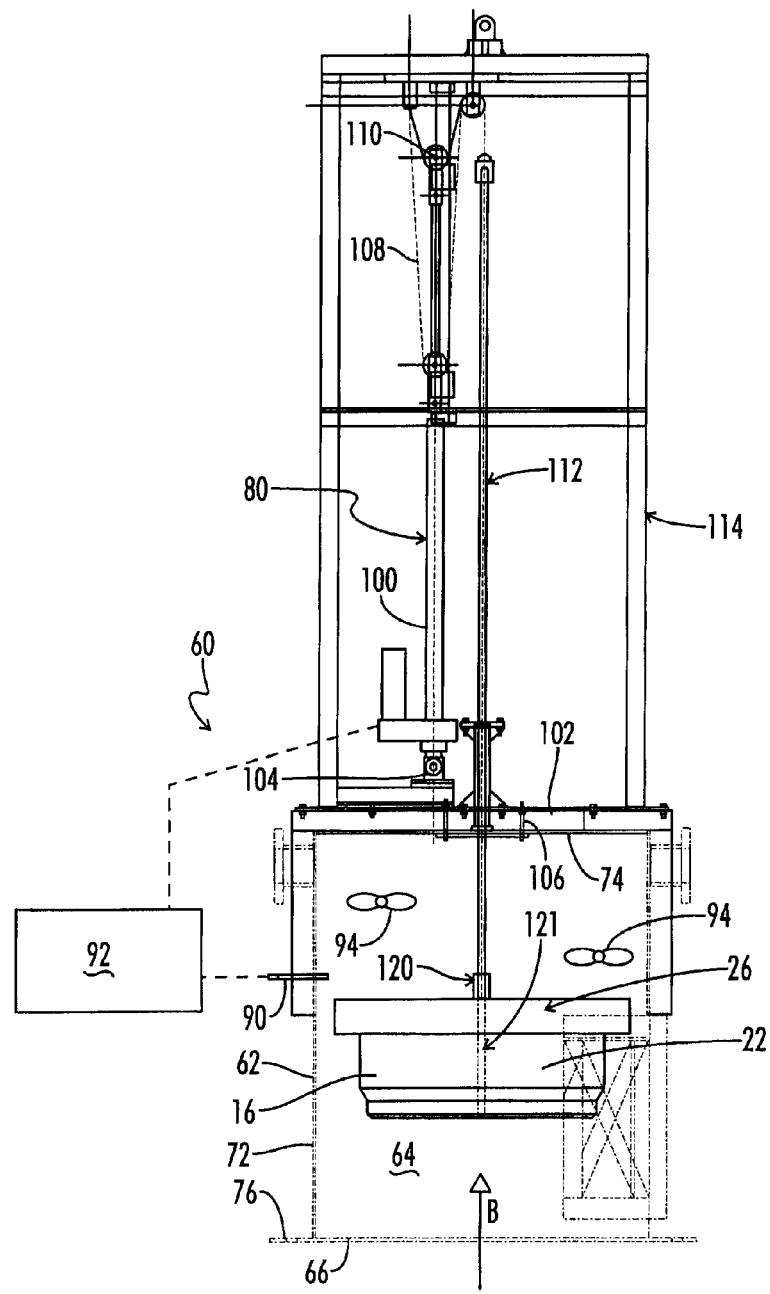
FIG. 5 is a side sectional view of the cooling assembly of FIG. 1.
Figure 9:
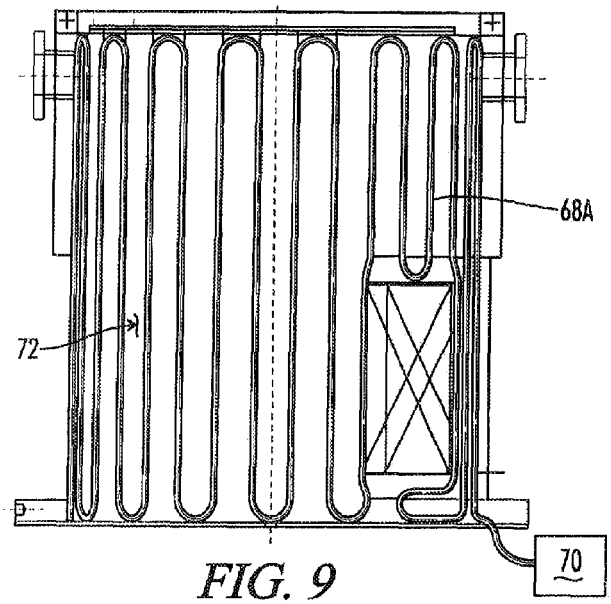
FIG. 9 is a side elevational view of the dome of FIG. 5, showing cooling coils mounted to the exterior.
Figure 10:
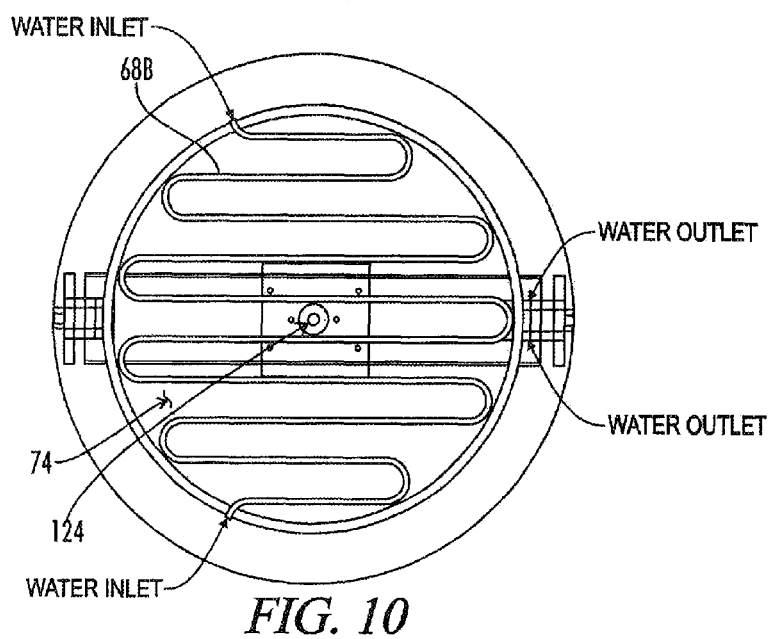
FIG. 10 is a top plan view of the dome of FIG. 5, showing cooling coils mounted to the exterior.

With reference now to FIG. 5, a cooling assembly 60 is selectively mountable to an upper end of the furnace to enclose the upper end of the susceptor chamber 20. The cooling assembly includes a dome 62 formed from copper or other non-magnetic material. The dome 62 defines an interior, gas-tight dome chamber 64, which holds an inert gas under slight positive pressure. During the heating portion of the furnace operating cycle, a lower end 66 of the dome is closed off from the susceptor chamber 20 by the furnace cap 16 (FIG. 1). It is not necessary for the cap 16 to seal the interior chamber 20 from the ambient environment, since the dome serves this purpose. The dome is actively cooled during the cool down portion of the furnace cycle. Specifically, as shown in FIGS. 9 and 10, cooling coils 68 are fitted to an exterior surface of the dome and are connected with an external heat exchanger 70. Preferably, the entire surface of the dome is used for cooling to maximize the rate of heat removal. A first set of the cooling coils 68A surrounds a cylindrical side wall 72 of the dome, while a second set of the cooling coils 68B is arranged exterior to an upper wall 74 of the dome.

The cooling assembly 60 is movable by a suitably positioned hoist (not shown) from a position away from the furnace to a position on top of the furnace. A peripheral flange 76 at a lower end of the dome is clamped to an upper portion 78 of the furnace wall (comprising upper ends of the refractory material and fiberglass pressure vessel, respectively), which extends above the susceptor (FIG. 2).

The dome serves as a heat exchanger for the furnace during cool down. As shown in FIG. 5, a lifting mechanism 80 is operable to lift the cap 16 of the furnace. This creates an opening 82 (FIG. 2) between the furnace chamber and the dome chamber 64. Specifically, the cap 16 is lifted from a closed position, shown in FIG. 1, where the lid portion 22 sits on the shelf 24, to an open position, shown in FIG. 2, where the lid portion is spaced from the shelf. Rapid mixing of the hot gas from the susceptor chamber 20 and cooled gas within the dome 62 takes place by natural convection. The degree of opening is adjusted by raising the cap 16 using a feedback control to limit the temperature within the dome chamber 64 to below the melting point of copper, preferably in the range of about 200-300° C., although higher temperatures are optionally sustained where temperature detection and control are particularly accurate. The cap 16 is movable, in infinitely variable amounts, in the direction of arrow B to a position in which it is housed entirely in the dome (FIG. 5).

The entire cooling assembly 60 is removable from the furnace, allowing the susceptor 10 to be readily removed for repair or replacement. A clamping mechanism 84, best shown in FIG. 11, selectively clamps the peripheral flange 76 of the cooling mechanism to the furnace wall 78. In this way, the dome 62 seals the upper end of the chamber 20 and dome chamber 64 from the outside, ambient environment, during a furnace run. The clamping mechanism 84 includes a cooling coil 86, which is fed with cooling water, to keep the clamping mechanism cool. Optionally, as shown in FIG. 1, an external support 88 carries most of the weight of the dome to avoid potential damage to the upper end of the furnace wall 78.

With reference to FIG. 5, one or more temperature detectors 90, such as thermocouples, are positioned within the dome 62. The temperature detectors provide a signal to a control system 92 which signals the lifting mechanism 80 to lower the cap to decrease the size of the opening 82, if the temperature within the dome chamber 64 becomes to high, and instructs the lifting mechanism to increase the size of the opening, by raising the cap 16, if the temperature drops below a preselected level.

Optionally, as shown in FIG. 5, fluid mixing means, such as fans 94, are provided within the dome chamber 64 to improve circulation of the gases between the susceptor chamber 20 and the dome chamber 64.

Above about 1500° C., heat flows most rapidly through the sides of the furnace and thus the rate of cooling through the insulation layer 58 is relatively fast. Thus, the cooling effects of the dome 62 are not generally beneficial during an initial period of the cool down portion of the cycle. The cap 16 of the furnace is therefore preferably kept closed during this initial cool down period between about 3100° C. and about 1500° C. Once the furnace temperature reaches about 1500° C., the insulation material inhibits cooling and the cooling action of the dome 62 becomes effective. Lifting of the cap 16 is therefore preferably commenced at this stage.

Figure 6:
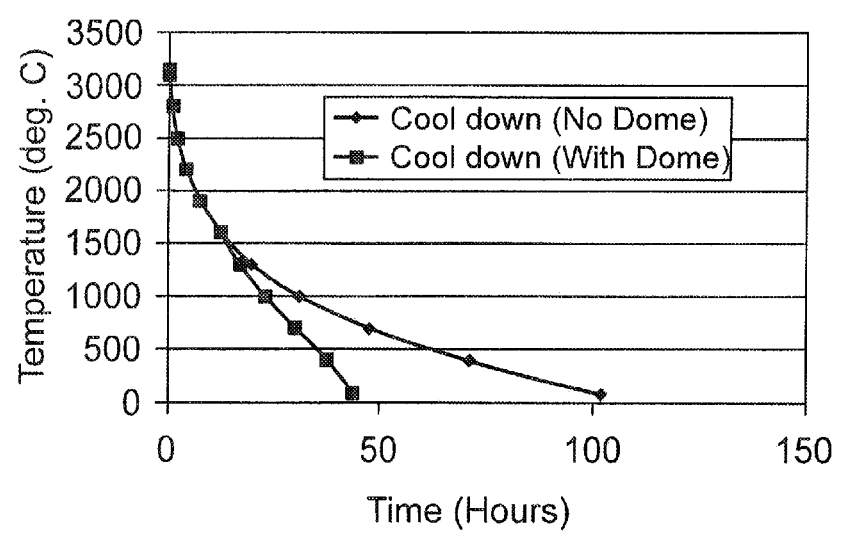
FIG. 6 is a plot illustrating the effects of the cooling assembly on furnace temperature over time.

FIG. 6 demonstrates the effect of the upper cooling assembly 60 on the rate of cooling of the furnace. Two curves are shown, one showing the predicted cooling of a furnace without a dome, the other showing the predicted cooling using the dome 62. It can be seen that the cooling time is about 48 hours when the dome is used, thus reducing the overall cool down time by at least half. These results were predicted for a susceptor of 63 cm internal diameter, 241 cm height, and 4.65 m$^2$ of heat transfer area in the dome (i.e., the total area of the dome side wall 72 and top wall 74).

With reference once more to FIG. 5, and reference also to FIG. 7, the lifting mechanism 80 advantageously includes a linear actuator 100. The actuator 100 is coupled at its lower end to a mounting plate 102, by a coupling joint 104. The mounting plate 102 is mounted to the upper wall 74 of the dome by bolts 106, or other suitable attachment members. The linear actuator 100, which may comprise a pneumatically or hydraulically operated piston 107, extends or retracts to draw on or to release one end of a roller chain 108, which passes over a system of pulleys 110. The other end of the chain 108 is connected with an upper end of a vertically oriented, cylindrical lift rod 112. The linear actuator 100, mounting plate 102 chain 108, and pulley system 110 are supported within a housing 114, formed from stainless steel, or the like, and are not subject to the hot gases within the dome chamber 64.

A lower end of the lift rod 112 extends into the dome chamber 64 and is coupled with the furnace cap 16 by a stainless steel coupling 120. The coupling 120 is mounted to a graphite support rod 121, which extends right through the cap 16. With reference also to FIG. 8, the rod 112 passes through a first opening 122 in the actuator mounting plate 102 and a second opening 124 in the upper wall 74 of the dome.

With continued reference to FIG. 8, a sealing and guiding assembly 130 serves to guide the lower end of the rod 112 through the openings 122, 124 and to provide a seal between the dome chamber 64 and the interior of the housing 114. Specifically, the sealing and guiding assembly includes a cylindrical sleeve 132, formed from stainless steel. The sleeve is welded, or otherwise mounted, a short distance above its lower end 133 to an annular mounting flange 134, which in turn is bolted to the mounting plate 102, around the opening 122. An upper end of the sleeve is mounted to a second annular flange 136 by bolts 138. The lower end 133 of the sleeve 132 extends below the mounting flange 102. An annular seal 140, such as an O-ring, is pressed by the lower end 133 of the sleeve 132 against an upper surface of the dome upper wall 74. The seal sealingly engages the lift rod 112 as it moves up and down therethrough. A spacer tube 142 is supported within the sleeve 132 between upper and lower bearings 144, 146, which are seated against the flange 136 and seal 140, respectively. The spacer tube 142 receives the lift rod 112 therethrough.

Turning once more to the furnace operation, several pyrometers 150 (three in the preferred embodiment) are mounted in thermal communication with corresponding tubes 152 which pass through the susceptor wall 12 into the susceptor chamber 20 (FIGS. 2-4). The pyrometers 150 are positioned at different regions of the susceptor chamber 20 and permit continuous monitoring of the surrounding temperature during heating and cooling of the susceptor chamber. Preferably, the pyrometers 150 signal the control system 92, which uses the detected temperatures to determine when to signal the lifting mechanism 80 to begin lifting the cap 16.

Several witness disks 154 are also positioned in the susceptor chamber 20 at various points throughout the hot zone prior to the start of a furnace cycle. The witness disks 154 provide an accurate determination of the highest temperature to which each disk has been exposed. In a preferred embodiment, the witness disks are formed from carbon, which becomes graphitized during the furnace run. The maximum temperature is determined by measuring the size of the graphite crystallites in the exposed disks 154, and comparing the measurements with those obtained from accurately calibrated sample disks. X-ray diffraction techniques are available for automated determination of crystallite size from the diffraction patterns produced.

The witness disks 154 are examined after the furnace run to reveal a more detailed pattern of temperature distribution than can be provided by the pyrometers 150 alone. Additionally, the disks 154 provide a check on the pyrometers 150, which tend to lose their calibration over time, or fail completely. Because of the low cost of the disks, and ease of use, many more witness disks can be used than is feasible with the pyrometers. The disks 154 are discarded after each furnace run and replaced with fresh disks.

Preferably, a database is maintained for each furnace to store pyrometer readings and disk measurements and is analyzed for trends. Pyrometer errors, induction coil end effects, and poorly insulated areas can be detected and corrected over the course of several furnace cycles.

A typical furnace run proceeds as follows. Items to be treated, such as pitch fibers to be graphitized, are loaded into one or more of the canisters 32. The canisters are closed and placed into the susceptor chamber 20, along with several fresh witness disks 154. The cooling assembly is maneuvered by a suitably positioned hoist (not shown) until the flange 76 is seated on the furnace wall portion 78. The atmosphere within the susceptor chamber 20 and dome chamber 64 is replaced with an inert gas, at a slight positive pressure. The inert gas is continuously passed through the chamber 20 during the run, via inlet and outlet feed lines (not shown). The cap 16 is lowered by the linear actuator 100 to the closed position, in which the cap closes the susceptor chamber 20. Cooling water flow through the cooling tubes 54 is commenced (cooling of the dome may delayed until some time later, prior to lifting the cap 16). The induction coils 30 are powered to heat the susceptor 10, thereby bringing the susceptor chamber 20 to operating temperature. This may take from one to two days, or more. Once the operating temperature is reached, e.g., 3150° C., the temperature in the susceptor chamber 20 is maintained at the operating temperature for a sufficient period of time to achieve the desired level of graphitization or to otherwise complete a treatment process. The control system 92 employs feedback controls, based on pyrometer measurements, to actuate the induction coils 30 according to the detected temperatures.

Once the heating phase is complete, the power to the induction coils 30 is switched off and the furnace begins to cool by conduction through the insulation layer 58. Once the temperature of the susceptor chamber 20 drops to about 1500° C., the linear actuator 100 is instructed to lift the cap 16 slightly, to an open position, allowing the hot gas within the susceptor chamber 20 to mix with the cooler gas within the dome chamber 64. As the temperature within the susceptor chamber falls further, the actuator 100 lifts the cap 16 further away from the chamber, increasing the size of the opening 82, so that the maximum rate of cooling can be sustained, without overheating the dome chamber 64. Below about 1000° C., the pyrometers 150 are preferably replaced with thermocouples. Once the susceptor chamber 20 reaches a suitable low temperature, the cooling assembly 60 is removed or otherwise opened to the atmosphere, for example, by opening valves (not shown) in the dome 62.

The improved cooling provided by the cooling assembly 60, the flexible graphite barrier layer 40, and accurate temperature monitoring provided by the witness disks 154 described, all contribute to improved furnace operation. Susceptor life is significantly improved by use of the flexible graphite. Tests in which a part of the susceptor was protected by the flexible graphite while another part was left unprotected show visible differences in the thickness of each of these parts of the susceptor after only a short period of time. Furnaces operating at over 3000° C. have been found to last at least 4-5 times as long between susceptor replacements as conventional furnaces operating without the flexible graphite barrier layer 40. The induction furnace is suited to extended operation at operating temperatures of up to 3150° C., which has not been feasible with prior induction furnaces.

It will be appreciated that while the cooling assembly has been described with reference to an induction furnace, the cooling system may also be employed to cool other types of furnace which operate at high temperatures.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An insulative plug for a furnace, comprising a plug having an outwardly extending peripheral flange and formed of a carbon foam having a pore distribution such that at least about 90% of the pore volume of the pores have a diameter of between about 10 and about 150 microns and at least about 1% of the pore volume of the pores have a diameter of between about 0.8 and about 3.5 microns.

2. The plug of claim 1 wherein at least about 95% of the pore volume of the pores have a diameter of between about 25 and about 95 microns.

3. The plug of claim 2 wherein from about 2% to about 10% of the pore volume of the pores have a diameter of about 1 to about 2 microns.

4. The plug of claim 1 wherein the carbon foam has a ratio of compressive strength to density of at least about 7000 psi/g/cc.

5. The plug of claim 4 wherein the carbon foam has a ratio of compressive strength to density of at least about 8000 psi/g/cc.

6. The plug of claim 5 wherein the carbon foam has a density of from about 0.05 to about 0.4 and a compressive strength of at least about 2000 psi.

7. The plug of claim 6 wherein the carbon foam has a porosity of between about 65% and about 95%.

8. The plug of claim 7 wherein the pores of the carbon foam have, on average, an aspect ratio of between about 1.0 and about 1.5.

9. The plug of claim 1 which has a permeability of no greater than about 3.0 darcys.

* * * * *